(No Model.)

G. L. HOPPING.
FRICTION CLUTCH.

No. 370,332. Patented Sept. 20, 1887.

Witnesses:
C. J. DeBeard
C. W. Bond

Inventor:
George L. Hopping

UNITED STATES PATENT OFFICE.

GEORGE L. HOPPING, OF CHICAGO, ILLINOIS, ASSIGNOR TO ROBERT TARRANT, OF SAME PLACE.

FRICTION-CLUTCH.

SPECIFICATION forming part of Letters Patent No. 370,332, dated September 20, 1887.

Application filed June 2, 1887. Serial No. 240,025. (No model.)

*To all whom it may concern:*

Be it known that I, GEORGE L. HOPPING, residing at Chicago, in the county of Cook and State of Illinois, and a citizen of the United States, have invented a new and useful Improvement in Friction-Clutches, of which the following is a specification, reference being had to the accompanying drawings, in which—

Figure 1:
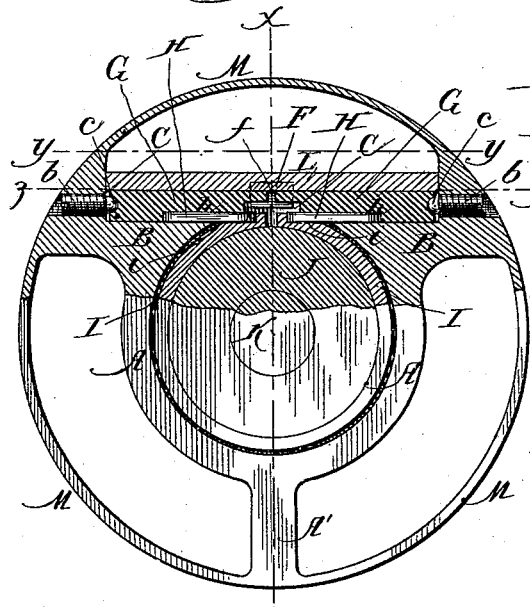
Figure 2:
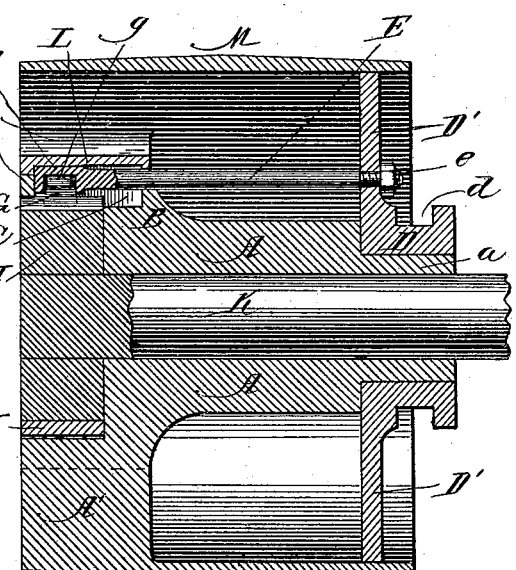
Figure 3:
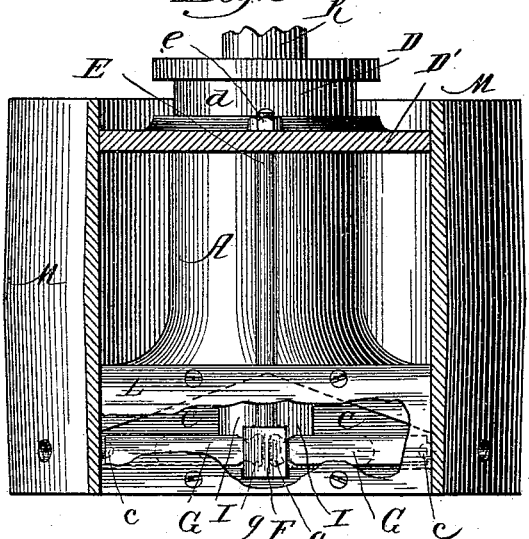
Figure 4:
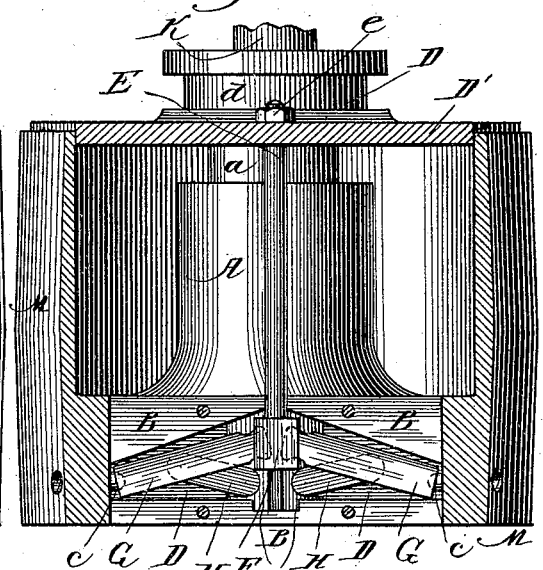

Figure 1 is an end elevation, partly in section. Fig. 2 is a central longitudinal section on line $xx$ of Fig. 1. Fig. 3 is a horizontal section on line $yy$ of Fig. 1, and Fig. 4 is a horizontal section on line $zz$ of Fig. 1.

The object of this invention is to construct a simple and at the same time effectual and reliable clutch, which can be applied to a hub to either receive or transmit power to or from a driving-shaft, pulley, or other device; and its nature consists in the several parts and combinations of parts hereinafter described, and pointed out in the claims.

In the drawings, A represents a hub or center having a longitudinal circular opening for the passage of a shaft, and having at one end, on one side, as shown, an extension or arm, A'.

B is a head or enlargement formed with the hub or center A, in the construction shown, at that end of the hub which has the extension A', and this head or enlargement has end extensions, which, in connection with the arm A', form the support for the rim or band of the pulley in the form of construction shown. Each end of the head B has therein a screw-threaded opening to receive a screw, $b$, the inner end of which has a rounded point, $c$, as shown in Fig. 1.

C is an opening formed in the head B, and having a straight wall on its front side and inclined walls on its rear side, which meet at a common center, as shown in Fig. 4.

D is a collar sliding on a tubular neck or extension, $a$, of the hub A, and having formed therewith a plate or rim, D', and, as shown, the collar D has a circumferential groove, $d$.

E is a rod, one end of which is screw-threaded and passes through the plate or disk D', and is locked thereto by a nut, $e$.

F is a head on the end of the rod E, and having in its side face a notch or recess, $f$.

G are toggle-arms, one located on each side of the head F, and having ends or heads $g$ to enter the recess $f$ of the head, and supported at the other end by the rounded point $c$ of the screw $b$, as shown in Figs. 1, 3, and 4.

H are links, one for each toggle-arm G. Each link is rounded at its ends and lies within a cut-away portion of the link G, the rounded end fitting a corresponding circle in the toggle.

I is a band of steel encircling a hub and divided at a point in line with the head F, and on each side of the division the ring is cut away to form a recess with a rounded end wall to receive the rounded end of the link H, as shown in Figs. 1 and 4.

J is a hub which the steel band I encircles, and which is mounted on the shaft from which or to which rotation is to be imparted.

K is the shaft.

L is a plate covering the opening C in the head B, and holding the toggles G in place, and, as shown, this plate has a recess in which the head F slides.

M is the rim, forming, in connection with the other parts, a pulley, which rim may be cast or formed with the extension A' and head B, or be suitably secured thereto, and the hub J can be a hub of a fly-wheel or another driving-pulley, or a simple hub mounted on the shaft K, and it is to be understood that either the hub or center A is to be keyed to the shaft, or else the hub J is to be keyed, and where one hub is keyed the other is to be loosely mounted.

The groove $d$ is adapted to receive half-rings connected to a fork having an arm or lever, by means of which the collar D can be moved in or out to apply or loosen the steel band I, and in use the movement of the collar D inward to the position shown in Figs. 2 and 3 advances the head F to bring the toggles G in a straight line, or nearly so, and this straightening of the toggles through the links H draws the band I in close contact with the hub J, so that the hub J and hub A will be rotated together and with the shaft K, and this impinging of the band I upon the hub J is had by reason of the power produced by bringing the inner ends of the toggles G together through the advance of the head F, which produces an end movement of the links H, by which the clasp of the band on the hub is insured, as the toggles have a bearing at their supported end on the head c, which is stationary, leaving the increased length of the toggles in being straightened to advance the links H and force the band I at its severed point nearer together. The band I is relaxed by withdrawing the collar D, which recedes the plate D', carrying with it the rod E and head F, and the backward movement of the head F swings the toggles G back, as shown in Fig. 4, releasing the bearing on the links H and allowing the ring I to spring apart, so that the connection between the ring I and hub J is broken, allowing one hub to rotate without imparting rotation to the other.

The device can be applied for driving a pulley, as shown, or it can be used for connecting two sections of a divided shaft, so that one section can be rotated independent of the other, or impart rotation to the other; or it can be used for imparting rotation to a fly-wheel or another driving-pulley by making the hub J a part of such fly-wheel, driving-pulley, or other device.

The hub A, with its head B, carrying the toggles and links, and the sliding head by which the toggles are operated, form in and of themselves a complete operating device for carrying the toggles and links to apply the friction-band, and by adding the extension A' enables a pulley to be formed with the power-applying devices. The toggles and links require but a small movement to exert a powerful pressure, and for this reason the device, as a whole, can be made to occupy but little space, and when the toggles are brought together they will remain in that position until carried back by the rod E or other moving device.

What I claim as new, and desire to secure by Letters Patent, is—

1. The rod E, provided with head F, toggles G, and links H, in combination with a friction-band, I, and hub J, for applying and releasing the band, substantially as specified.

2. The sliding collar D, plate D', and rod E, having head F, in combination with the toggles G, links H, friction-band I, and hub J, substantially as and for the purpose specified.

3. The hub A, having head B, in combination with the toggles G, links H, and friction-band I, substantially as and for the purpose specified.

4. The hub A, provided with head B, having the cavity C, sliding collar D, plate D', and rod E, having head F, in combination with the toggles G, links H, friction-band I, and hub J, substantially as and for the purpose specified.

GEORGE L. HOPPING.

Witnesses:
C. J. DE BERARD,
O. W. BOND.